(12) United States Patent
El Ghobary et al.

(10) Patent No.: US 6,818,675 B2
(45) Date of Patent: Nov. 16, 2004

(54) PROCESS FOR PREPARING POLYURETHANE FOAM

(75) Inventors: Hassan El Ghobary, Geneva (CH); Louis Muller, Divone-les-Baines (FR)

(73) Assignee: General Electric Company, Pittsfield, MA (US)

( * ) Notice: Subject to any disclaimer, the term of this patent is extended or adjusted under 35 U.S.C. 154(b) by 171 days.

(21) Appl. No.: 10/214,448

(22) Filed: Aug. 6, 2002

(65) Prior Publication Data

US 2004/0029986 A1 Feb. 12, 2004

(51) Int. Cl.[7] .............................................. C08G 18/18
(52) U.S. Cl. ...................... 521/129; 521/114; 521/115; 521/130; 521/131; 521/163; 521/164; 521/167; 521/170; 521/172; 521/174
(58) Field of Search ................................ 521/114, 115, 521/129, 130, 131, 163, 164, 167, 170, 172, 174

(56) References Cited

U.S. PATENT DOCUMENTS

| | | | |
|---|---|---|---|
| 2,932,621 A | 4/1960 | Terry | |
| 3,385,806 A | 5/1968 | Critchfield et al. | |
| 3,728,291 A | 4/1973 | Carroll et al. | |
| 3,892,687 A | 7/1975 | Bechara et al. | |
| 3,988,267 A | 10/1976 | Bechara et al. | |
| 3,993,652 A | 11/1976 | Bechara et al. | |
| 4,007,140 A | 2/1977 | Ibbotson | |
| 4,025,466 A | 5/1977 | Jourquin et al. | |
| 4,040,992 A | 8/1977 | Bechara et al. | |
| 4,049,591 A | 9/1977 | McEntire et al. | |
| 4,086,213 A | 4/1978 | Bechara et al. | |
| 4,101,465 A | 7/1978 | Lockwood et al. | |
| 4,116,879 A | 9/1978 | Bechara et al. | |
| 4,165,412 A | 8/1979 | Bechara et al. | |
| 4,175,097 A | 11/1979 | McEntire | |
| 4,204,062 A | 5/1980 | Bechara et al. | |
| 4,211,849 A | 7/1980 | Kollmeier et al. | |
| 4,232,152 A | 11/1980 | Bechara et al. | |
| 4,286,072 A | 8/1981 | McEntire et al. | |
| 4,366,084 A | 12/1982 | Arbir et al. | |
| 4,419,461 A | 12/1983 | Arbir et al. | |
| 4,421,869 A | 12/1983 | Arbir et al. | |
| 4,450,246 A | 5/1984 | Jachimowicz | |
| 4,464,488 A | 8/1984 | Zimmerman et al. | |
| 4,469,653 A | 9/1984 | Nissen et al. | |
| 4,563,484 A | 1/1986 | Jachimowicz | |
| 4,582,861 A | 4/1986 | Galla et al. | |
| 4,617,286 A | 10/1986 | Arai et al. | |
| 4,621,106 A | 11/1986 | Fracalossi et al. | |
| 4,701,474 A | 10/1987 | Bailey, Jr. et al. | |
| 4,758,605 A | 7/1988 | Williams | |
| 4,780,485 A | 10/1988 | Ashida | |
| 4,785,025 A | 11/1988 | Galla et al. | |
| 4,785,027 A | 11/1988 | Brasington et al. | |
| 4,880,848 A | 11/1989 | Ghali | |
| 4,935,453 A | 6/1990 | Bock et al. | |
| 5,006,501 A | 4/1991 | Tamano et al. | |
| 5,168,009 A | 12/1992 | Petrella et al. | |
| 5,179,131 A | 1/1993 | Wujcik et al. | |
| 5,240,970 A | 8/1993 | Nichols et al. | |
| 5,252,624 A | 10/1993 | Milliren et al. | |
| 5,288,833 A | 2/1994 | Parodi et al. | |
| 5,288,864 A | 2/1994 | Nichols et al. | |
| 5,304,578 A | 4/1994 | Tamano et al. | |
| 5,306,738 A | 4/1994 | Yoshimura et al. | |
| 5,308,882 A | 5/1994 | Washington | |
| 5,321,050 A | 6/1994 | Morimoto et al. | |
| 5,478,494 A | 12/1995 | Lee et al. | |
| 5,591,781 A | 1/1997 | Yoshimura et al. | |
| 5,859,079 A | 1/1999 | Mercando et al. | |
| 6,114,403 A | 9/2000 | Mercando et al. | |
| 6,232,356 B1 | 5/2001 | Mercando et al. | |
| 6,387,972 B1 * | 5/2002 | Ghobary et al. | ............. 521/115 |
| 6,395,796 B1 | 5/2002 | Ghobary et al. | |
| 6,423,756 B1 * | 7/2002 | Ghobary et al. | ............. 521/128 |
| 6,660,781 B1 * | 12/2003 | Ghobary et al. | ............. 521/129 |

FOREIGN PATENT DOCUMENTS

| | | |
|---|---|---|
| CA | 651638 | 11/1962 |
| EP | 0 484 749 | 5/1982 |
| EP | 0 088 377 B1 | 9/1983 |
| EP | 0 088 377 A2 | 9/1983 |
| EP | 0 140 480 | 5/1985 |
| EP | 0 276 956 | 8/1988 |
| EP | 0 361 937 A3 | 4/1990 |
| EP | 0 585 636 | 3/1994 |
| EP | 0 656 383 | 6/1995 |
| EP | 1 018 525 | 7/2000 |
| EP | 1 018 526 | 7/2000 |
| GB | 879167 | 10/1961 |
| GB | 1541593 | 3/1979 |
| JP | 53-28696 | 3/1978 |
| JP | 53-71197 | 6/1978 |
| WO | WO 94/02525 | 2/1994 |

OTHER PUBLICATIONS

Fondots, "Developments in Amine Catalysts for Urethane Foam", J. Cellular Plastics, 1975, pp. 250–255.

* cited by examiner

Primary Examiner—John M. Cooney, Jr.

(57) ABSTRACT

A process for preparing a polyurethane foam is provided which comprises reacting a polyisocyanate and an active hydrogen-containing component, including water and an organic polyol, in the presence of a catalytically effective amount of a delayed action amine catalyst system, and optionally an organotin catalyst. The delayed action catalyst is composed of the reaction product of (a) one or more carboxylic acids having hydroxy and/or halo functionality; (b) one or more tertiary amine ureas; and, optionally, (c) a reactant selected from the group consisting of specific reactive tertiary amine(s), specific tertiary amine carbamate (s) and mixture thereof.

23 Claims, No Drawings

PROCESS FOR PREPARING POLYURETHANE FOAM

BACKGROUND OF THE INVENTION

1. Technical Field

This invention generally relates to process for producing polyurethane foams. The invention is especially adapted for producing polyurethane foams employing the one-shot foaming process, the quasi-prepolymer process and the pre-polymer process. Specifically, the invention relates to polyurethane catalysis with a delayed action catalyst system and optionally an organotin catalyst. The delayed action catalyst is composed of at least the reaction product of (a) one or more carboxylic acids having hydroxy and/or halo functionality; (b) one or more tertiary amine ureas and, optionally, (c) one or more specific reactive tertiary amine(s) and/or one or more specific tertiary amine carbamate(s) for promoting reactions involved in the production of polyurethanes, preferably one-shot polyurethanes, and particularly flexible polyurethane foams.

2. Background

Polyurethane foams are produced by reacting a di- or polyisocyanate with compounds containing two or more active hydrogens, generally in the presence of blowing agent(s), catalysts, silicone-based surfactants and other auxiliary agents. The active hydrogen-containing compounds are typically polyols, primary and secondary polyamines, and water. Two major reactions are promoted by the catalysts among the reactants during the preparation of polyurethane foam, gelling and blowing. These reactions must proceed simultaneously and at a competitively balanced rate during the process in order to yield polyurethane foam with desired physical characteristics.

Reaction between the isocyanate and the polyol or polyamine, usually referred to as the gel reaction, leads to the formation of a polymer of high molecular weight. This reaction is predominant in foams blown exclusively with low boiling point organic compounds. The progress of this reaction increases the viscosity of the mixture and generally contributes to crosslink formation with polyfunctional polyols. The second major reaction occurs between isocyanate and water. This reaction adds to urethane polymer growth, and is important for producing carbon dioxide gas which promotes foaming. As a result, this reaction often is referred to as the blow reaction. The blow reaction is essential for avoiding or reducing the use of auxiliary blowing agents.

Both the gel and blow reactions occur in foams blown partially or totally with the in-situ formation of carbon dioxide gas. In fact, the in-situ generation of carbon dioxide by the blow reaction plays an essential part in the preparation of "one-shot" water-blown polyurethane foams. Water-blown polyurethane foams, particularly flexible foams, are produced by both molded and slab foam processes.

As noted above, in order to obtain good urethane foam structure, the gel and blow reactions must proceed simultaneously and at optimum balanced rates. For example, if the carbon dioxide evolution is too rapid in comparison with the gel reaction, the foam tends to collapse. Alternatively, if the gel extension reaction is too rapid in comparison with the blow reaction generating carbon dioxide, foam rise will be restricted, resulting in a high-density foam. Also, poorly balanced crosslinking reactions will adversely impact foam stability. In practice, the balancing of these two reactions is controlled by the nature of the promoters and catalysts, generally amine and/or organometallic compounds, used in the process.

Flexible and rigid foam formulations usually include e.g., a polyol, a polyisocyanate, water, optional blowing agent (low boiling organic compound or inert gas, e.g., $CO_2$), a silicone type surfactant, and catalysts. Flexible foams are generally open-celled materials, while rigid foams usually have a high proportion of closed cells.

Historically, catalysts for producing polyurethanes have been of two general types: tertiary amines (mono and poly) and organo-tin compounds. Organometallic tin catalysts predominantly favor the gelling reaction, while amine catalysts exhibit a more varied range of blow/gel balance. Using tin catalysts in flexible foam formulations also increases the quantity of closed cells contributing to foam tightness. Tertiary amines also are effective as catalysts for the chain extension reaction and can be used in combination with the organic tin catalysts. For example, in the preparation of flexible slabstock foams, the "one-shot" process has been used wherein triethylenediamine is employed for promoting the water-isocyanate reaction and the cross-linking reaction, while an organic tin compound is used in synergistic combination to promote the chain extension reaction.

Flexible polyurethane foams are commercially prepared as slabstock foam or in molds. Some slabstock foam is produced by pouring the mixed reactants in large boxes (discontinuous process), while other foam is prepared in a continuous manner by deposition of the reacting mixture on a paper lined conveyor. The foam rises and cures as the conveyor advances and the foam is cut into large blocks as it exits the foam machine. Some of the uses of flexible slabstock polyurethane foams include: furniture cushions, bedding, and carpet underlay.

In the discontinuous processes, the initiation of the reaction must be delayed to allow uniform laydown of the reacting mixture and allow excess air entrapped during reactant mixing to escape. Otherwise, foam splitting caused by the tardy release of such entrapped air may occur. In such situations, delayed action catalysts can be used to achieve the required reactivity profile. The problem also can be acute with slabstock foam produced by the continuous process on a machine with a short conveyor. In this case, the formulation has to be highly catalyzed in order to be sufficiently cured when the foam reaches the cutting saw. Thus, not only is delayed action necessary for a uniform laydown, but once activated, rapid catalytic action is critical.

The process for making molded foams typically involves the mixing of the starting materials with polyurethane foam production machinery and pouring the reacting mixture, as it exits the mix-head, into a mold. The principal uses of flexible molded polyurethane foams are, e.g., automotive seats, automotive headrests and armrests and furniture cushions. Some of the uses of semi-flexible molded foams include, e.g., automotive instrument panels, energy managing foam, and sound absorbing foam.

Amine emissions from polyurethane foams have become a major topic of discussion, particularly in car interior applications, and some car manufacturers request that all Volatile Organic Compound's ("VOC's") be reduced. One of the main components of VOC's evaporating from flexible molded foams is the amine catalyst. To reduce such emissions, catalysts having a very low vapor pressure should be used. Alternatively, if the catalysts have reactive hydroxyl or amine groups they can be linked to the polymer network. If so, insignificant amine vapor will be detected in the fogging tests. However, the use of the reactive amines is not without difficulties. Reactive amines are known to degrade some fatigue properties such as, for example, humid aging compression set ("HACS").

Modern molded flexible and semi-flexible polyurethane foam production processes have enjoyed significant growth. Processes such as those used in Just-in-Time (JIT) supply plants have increased the demand for rapid demold systems, i.e., systems in which the molding time is as short as possible. Gains in productivity and/or reduced part cost result from reduced cycle times. Rapid cure High Resilience (HR) molded flexible foam formulations typically achieve demold times of three to five minutes. This is accomplished by using one or more of the following: a higher mold temperature, more reactive intermediates (polyols and/or isocyanate), or increased quantity and/or activity of the catalysts.

High reactivity molded polyurethane systems give rise to a number of problems however. The fast initiation times require that the reacting chemicals be poured into a mold quickly. In some circumstances a rapid build-up of the viscosity of the rising foam causes a deterioration of its flow properties and can result in defects in the molded parts. Additionally, rapidly rising foam can reach the parting line of the mold cavity before the cover has had time to close resulting in collapsed areas in the foam. In such situations, delayed action catalysts can potentially be used to improve the initial system flow and allow sufficient time to close the mold. As utilized herein, the expression "delayed action catalysts" shall be understood to refer to catalysts that display the desirable property of having a slow start followed by increased activity. That is, a delayed action catalyst will exhibit a low activity at first followed by increased activity at a later time. Catalysts exhibiting high catalytic activity following activation are especially useful. However, increasing the level of reactive catalysts in order to achieve good curing generally results in worsening the fatigue properties of the produced parts.

Another difficulty experienced in the production of molded foams, which is usually worse in the case of rapid cure foam formulations, is foam tightness. A high proportion of closed cells causes foam tightness at the time the molded foam part is removed from the mold. If left to cool in that state, the foam part will generally shrink irreversibly. A high proportion of open cells are required if the foam is to have the desired high resiliency. Consequently, foam cells have to be opened physically either by crushing the molded part or inserting it into a vacuum chamber. Many strategies have been proposed, both chemical and mechanical, to minimize the quantity of closed cells at demold.

The principal uses of rigid polyurethane foams are, e.g., pour-in-place insulation foams for refrigeration applications, transportation applications, and metal doors, as well as boardstock and sprayed insulation. In rigid foam applications, delayed action catalysts can also find use for the same reasons needed in flexible foam molding, to delay the initial system reactivity while offering the short cure times required for fast production cycles.

Delayed action catalysts are expected to find their main application in the manufacture of molded flexible and semi-flexible polyurethane foam parts. In such applications, it is desirable to make the molding time as short as possible ("rapid demold"), but the onset of the reaction must be delayed so that the viscosity increase accompanying the reaction does not jeopardize proper mold filing. Foams of a desired density can be obtained, particularly with MDI and MDI/TDI systems, from the delayed onset of viscosity build-up leading to better expansion of the reacting mixture.

Historically, delayed action catalysts used in the above-described processes are acid-blocked amines, usually simple amine salts of a tertiary amine and a carboxylic acid such as formic acid, acetic acid, or 2-ethylhexanoic acid (J. Cellular Plastics, p. 250–255, September/October, 1975). The salts are not catalytically active and, as a consequence, the amines do not activate the reaction until the salt is dissociated by the increasing temperature of the reacting mixture. Unfortunately, using carboxylic acid blocked amine catalysts generally has a tightening effect on the foam (see, e.g., U.S. Pat. Nos. 3,385,806, 4,701,474, and 4,785,027).

In the production of TDI molded foam, such as for automotive cushions, grafted polyether polyol is mixed with polyether polyol in order to obtain the desired foam hardness. Hardness often is a major limiting factor for density reduction. Because conventional delayed action, acid blocked amine catalysts (i.e., amine salts of formic, acetic, propionic and 2-ethylhexanoic acids) produce foams with lower final hardness, such catalysts are ill-suited for making lower density grade TDI molded foam.

The recent, remarkable progress made by major polyol producers to produce higher reactivity polyols, which has led to accelerated TDI molded foam curing, highlights the need for new delayed action catalysts. The high reactivity polyols tend to produce tighter foams. Since conventional delayed action acid-blocked amine catalysts also give tight foams, their conjoint use with the newer polyols exacerbates the tightness problem. Indeed, it becomes difficult to crush the foam without destroying the foam structure.

However, the need remains in the polyurethane industry for additional catalysts having a long initiation time. Most importantly, these catalysts should delay the onset of the isocyanate-polyol reaction, exhibit good curing rate, and provide excellent physical properties of produced parts. In addition, these catalyst should be capable of being incorporated into the polymer structure (i.e., reactive catalysts).

3. Description of Related Art

The use of acid-grafted polyether polyols as reactivity controllers for the production of polyurethane foams is disclosed in U.S. Pat. No. 4,701,474. Such acid-grafted polyether polyols purportedly reduce the reactivity of polyurethane foam formulations without the tightening effect which usually results from using carboxylic acid-amine salts. The number average molecular weight range claimed for the disclosed acid-grafted polyether polyols is 1,000 to 10,000.

Preparing polyurethane foams in the presence of polyether acids is disclosed in U.S. Pat. No. 4,785,027. The polyether acids are mono- or di-acids with the acid functional groups located at the ends of the polymer chains. The polyether chain is built from ethylene and/or propylene oxide to have repeating oxyalkylene groups. In the case of mono acids, the other terminal group can be an alkyl or hydroxyl function. The presence of the hydroxyl functional group is optional. Such polyether acids purportedly delay the initial reaction rate without increasing foam tightness observed with formic acid-amine salts. It is stated that the system has an advantage over systems based on formic acid in that the polyurethane foam is not tight and does not suffer from skin peeling.

In U.S. Pat. No. 4,366,084, the fuming of dimethylaminopropylamine (DMAPA) is reduced by blocking the amine with phenol. The reduction in fuming increases directly with the percent blocking. According to the patent, using the DMAPA-phenol salts at varied blocking ratios does not cause any deterioration in the air flow and compression set properties of the foam.

U.S. Pat. No. 5,179,131 discloses that the addition of mono- or dicarboxylic acids to polyurethane foam formulations made using polyisocyanate polyaddition polymer poly-dispersions results in a reduction in foam shrinkage. The functional groups attached to the acid are either alkyl or alkylene.

The use of the amine salts of tertiary amino-acids as delayed action catalysts in the production of polyurethanes is disclosed in U.S. Pat. No. 4,232,152.

The use of particular N-hydroxyalkyl quaternary ammonium carboxylate salts as delayed action catalysts for the production of polyurethane is disclosed in U.S. Pat. Nos. 4,040,992 and 4,582,861 and EP Patent No. 0 484 749.

The use of particular aliphatic tertiary monoamines, and the carboxylic acid salts thereof as catalysts, in the production of polyurethane foam is disclosed in U.S. Pat. Nos. 4,450,246 and 4,617,286; U.K. Patent No. 879,167 and in Canadian Patent No. 651,638. A variety of organic mono or dicarboxylic acids are disclosed. Canadian Pat. 651,638, describes preparing polyurethane foams from an isocyanate-terminated polytetramethyleneether or polypropyleneether polyurethane prepolymer and water, in the presence of an acid-amine salt. In certain examples, salts of the hydroxy-acid, citric acid and either N-methyl morpholine or triethylamine are specifically exemplified. U.K. Patent 879,167 describes using a tertiary amine salt of lactic acid.

U.S. Pat. No. 2,932,621 discloses the use of dimethylethanolamine salts of dicarboxylic acids (such as oxalic acid) as a catalyst in the preparation of polyurethane foam.

U.S. Pat. No. 3,728,291 describes the use of triethylenediamine (TEDA) salts of formic acid in combination with 1-(2-hydroxypropyl) imidazole as a catalyst to permit wider tin latitude in the preparation of polyurethane foams.

U.S. Pat. Nos. 3,862,150 and 4,165,412 discloses the use of tertiary amines and substituted carboxylic acids as catalysts in preparing polyurethane foams. The acid must have a carboxyl group at one end of the molecule and a group selected from CN, SO, $SO_2$, CO, $NO_2$, $COCH_3$ and CO-phenyl on the other end. An example is the salt of TEDA and cyanoacetic acid.

European Patent No. 0,088,377 discloses a method for producing carbamate and carbonate salts of tertiary amines which comprises admixing secondary and tertiary amines in the presence of carbon dioxide.

European Patent No. 0,361,937 discloses the use of carboxylic acid salts to slow down the reaction between aminated polyether polyols and isocyanate, so that effective foaming can take place before the reaction is completed.

European Patent No. 0,140,480 discloses the use of monocarboxylic acid salts of bis-(aminoethyl) ether derivatives as catalysts for the preparation of polyurethane foams.

More recently, it was discovered that salts of a tertiary amine and a carboxylic acid with hydroxyl and/or halo functionality could advantageously be used as delayed action catalysts for promoting reactions involved in the production polyurethanes, including one-shot polyurethanes, and particularly flexible polyurethane foams. This technology is described in U.S. Pat. Nos. 5,489,618, and 6,395,796 and E.P. Patent No. 0 656 383. The use of such amine salts results in the manufacture of polyurethane foams which are either more open or more easily opened, or both. Also, U.S. Pat. No. 6,387,972 describes the use of specific reactive tertiary amine salts to improve humid aging compression set

SUMMARY OF THE INVENTION

It is an object of the present invention to provide a delayed action catalyst system to catalyze the reaction between an isocyanate functionality and an active hydrogen-containing compound, e.g., an alcohol, a polyol, an amine, water, etc., to make polyurethane foams.

Accordingly, a process for preparing a polyurethane foam is provided which comprises reacting a polyisocyanate and an active hydrogen-containing component, including water and an organic polyol, in the presence of a catalytically effective amount of a delayed action amine catalyst system comprising a reaction product of (a) one or more carboxylic acids having hydroxy and/or halo functionality; (b) one or more tertiary amine ureas; and, optionally, (c) a reactant selected from the group consisting of specific reactive tertiary amine(s), specific tertiary amine carbamate(s) and mixtures thereof. If desired, one or more organotin catalysts can be employed in the polyurethane process.

Further in accordance with the present invention, a polyurethane foam is provided, the polyurethane foam having repeating units derived from the reaction of an organic polyisocyanate and an active hydrogen-containing component, including water and an organic polyol, and a catalytically effective amount of a delayed action amine catalyst system comprising a reaction product of (a) one or more carboxylic acids having hydroxy and/or halo functionality; (b) one or more tertiary amine ureas; and, optionally, (c) a reactant selected from the group consisting of specific reactive tertiary amine(s), specific tertiary amine carbamate(s) and mixtures thereof. If desired, one or more organotin catalysts can also be employed.

DETAILED DESCRIPTION OF THE PREFERRED EMBODIMENTS

The present invention is related to polyurethane catalysis, with a delayed catalyst system and optionally organotin catalyst. The catalyst system comprises the reaction product of (a) one or more carboxylic acids having hydroxy and/or halo functionality; (b) one or more tertiary amine ureas; and, optionally, (c) a reactant selected from the group consisting of specific reactive tertiary amine(s), specific tertiary amine carbamate(s) and mixtures thereof. The use of the subject catalyst system in the production of polyurethane foams, especially foams produced using the one-shot foaming, the quasi-prepolymer and the pre-polymer processes, offers significant advantages over the use of urea reactive catalysts.

Use of these subject delayed catalyst systems in techniques such as the one-shot foaming technique, unexpectedly results in the production of high resiliency (HR) flexible polyurethane foams having improved durability characteristics such as, for example, HACS, relative to those obtained with the same reactive urea tertiary amine(s) alone. The expression "improved durability characteristics" as utilized herein refers to a value of a measurement of a property or properties related to durability, e.g., HACS, being at least equal to if not better than the requirements set forth by the end user. This finding is surprising as it is well known to those skilled in the art that tertiary amine carboxylic acid salts do not significantly affect the HACS. Furthermore, the significant improvement of HACS is achieved only in conjunction with specific reactive tertiary amines and mixtures thereof. Surprisingly, the significant improvement in durability properties of various foam formulations, e.g., different technologies (such as TDI and MDI) and different foam densities, is achieved mainly with hydroxy- and/or halo-carboxylic acids. Such improvement is dependent on the specific reactive tertiary amine or reactive tertiary amine mixtures, the blocking percentage, and the type of hydroxy- and/or halo-carboxylic acids.

Another advantage of the delayed catalytic action of the subject catalyst system(s) is improved flow of the reacting mixture and the production of more open or more easily to open foam. This quality is demonstrated by reduced force to crush (FTC). The production of more open or more easily to open foam results in foam showing less shrinkage. A further advantage of the catalyst system is the production of high resilient molded foam with improved hardness particularly when using TDI.

This invention broadly relates to a process for making flexible and semi-flexible polyurethane foams and for making rigid polyurethane foams. The process is especially suitable for making flexible, semi-flexible, and rigid foams using the one shot foaming, the quasi-pre-polymer and the pre-polymer processes. The polyurethane reaction kinetics of the processes disclosed herein are controlled by including, in the foaming mixture, a delayed action amine catalyst system and optionally an organotin catalyst. The delayed action catalyst comprising the reaction product of (a) one or more carboxylic acids having hydroxy and/or halo functionality; (b) one or more tertiary amine ureas; and, optionally, (c) a reactant selected from the group consisting of specific reactive tertiary amine(s), specific tertiary amine carbamate(s) and mixtures thereof, for promoting reactions involved in the production of polyurethanes, preferably one-shot polyurethanes, and particularly flexible polyurethane foams.

The polyurethane manufacturing process of the present invention typically involves the reaction of an organic polyisocyanate; a polyol, e.g., a polyol having a hydroxyl number from about 15 to about 700, and a delayed action catalyst system composed of the foregoing reaction products. In addition to the previously indicated materials, flexible and semi-flexible foam formulations (hereinafter referred to simply as flexible foams) also generally include: water; an optional organic low boiling auxiliary blowing agent or an optional inert gas; a silicone surfactant; an optional tin catalyst, and an optional crosslinker for stabilization or hardening. Rigid foam formulations often contain both a low boiling organic material or an inert gas and water for blowing.

The "one shot foam process" for making polyurethane foam is a one-step process in which all of the ingredients necessary (or desired) for producing the foamed polyurethane product including the polyisocyanate, the organic polyol, water, catalysts, surfactant(s), optional blowing agents and the like are simply blended together, poured onto a moving conveyor or into a mold of a suitable configuration and cured. The one shot process is to be contrasted with the prepolymer process wherein a liquid prepolymer adduct of a polyisocyanate and a polyol normally having terminal isocyanate groups first is prepared in the absence of any foam-generating constituents and then the prepolymer is reacted with water in the presence of catalyst in a second step to form the solid urethane polymer.

Hydroxyl and/or halo functional carboxylic acids useful in forming the delayed action catalyst system according to the present invention have the general formula:

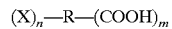
$$(X)_n-R-(COOH)_m$$

wherein R is at least a divalent hydrocarbon moiety, typically at least a divalent linear or branched aliphatic hydrocarbon moiety and/or at least a divalent alicyclic or aromatic hydrocarbon moiety; X is independently chlorine, bromine, fluorine or hydroxyl; n is an integer having a value of at least 1 and allows for mono and poly substitution of a halogen and/or a hydroxyl on the hydrocarbon moiety and m is an integer having a value of at least 1 and allows for mono and polycarboxyl substitution on the hydrocarbon moiety, with the proviso that no single carbon atom has more than two X substituents. Generally, m and n will independently have a value of from 1 to about 4.

The "at least a divalent hydrocarbon moiety" can be a saturated or unsaturated hydrocarbon moiety of 1 to 20 carbon atoms, including a linear aliphatic hydrocarbon moiety, a branched aliphatic hydrocarbon moiety, an alicyclic hydrocarbon moiety or an aromatic hydrocarbon moiety. Stated otherwise, R can be, for example, a linear, or branched alkylene group of one to about 20 carbon atoms, a cyclic alkylene group of between 4 to about 10 carbon atoms, an arylene, an alkarylene, or an aralkylene group of from about 6 to about 20 carbon atoms. Alkylenes of 2 to about 10 carbons and 6-carbon arylenes are generally preferred. Specific non-limiting examples of suitable hydrocarbon moieties are methylene, ethylene, 1,1-propylene, 1,3-propylene, 1,2-propylene, 1,4-butylene, butylene, 1,1-amylene, 1,1-decylene, 2-ethyl-1,1-pentylene, 2-ethylhexylene, o-, m-, p- phenylene, ethyl-p-phenylene 2,5-naphthylene, p,p'-biphenylene, cyclopentylene, cycloheptylene, xylene, 1,4-dimethylenephenylene and the like. One skilled in the art will readily appreciate the wide variety of available hydrocarbon moieties for use herein. While the above-noted radicals have two available substitution sites, at least one for a carboxyl group and one for a hydroxyl or a halogen, it is contemplated that additional hydrogens on the hydrocarbon could be replaced with further halogen and/or hydroxyl and/or carboxyl groups.

Suitable hydroxy and halo functional acids for use herein include, but are not limited to, salicylic acid, benzilic acid, hydroxybenzoic acid, dihydroxybenzoic acid, trihydroxybenzoic acid, gluconic acid, citric acid, glycolic acid, dimethylolpropionic acid, malic acid, lactic acid, tartaric acid, 2-hydroxymethylpropionic acid, hydroxybutyric acid, chloropropionic acid, bromopropionic acid, dichloropropionic acid, dibromopropionic acid, chloroacetic acid, dichloroacetic acid, bromoacetic acid, dibromoacetic acid, bromobutyric acid, bromoisobutyric acid, dichlorophenylacetic acid, bromomalonic acid, dibromosuccinic acid, 3-chloro-2-hydroxypropionic acid, dichlorophthalic acid, chloromaleic acid, fluorobenzoic acid, chlorobenzoic acid, bromobenzoic acid, difluorobenzoic acid, dichlorobenzoic acid, dibromobenzoic acid, dibromosalicylic acid, 2-bromocaprylic acid, 2-bromohexadecanoic acid, 2,2-dichloro-1-methyl propionic acid and mixtures thereof. Hydroxy and halo functional acids useful in the practice of the present invention generally a weight average molecular weight ($M_w$) below about 300, and preferably below about 200.

A second component in forming the reaction product of the delayed action catalyst system are tertiary amine ureas. Suitable tertiary amine ureas for use herein can be any of the mono- and bis-tertiary amine ureas used for catalyzing the reactions of isocyanate with compounds containing active hydrogens represented by the general formula.

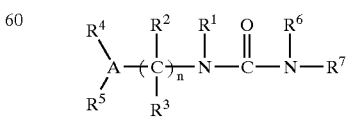

in which A represents CH or N; $R^1$ represents hydrogen or the group

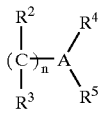

wherein n represents an integer from 1 to 6; $R^2$ and $R^3$ each represent hydrogen or a $C_1$–$C_6$ alkyl group; $R^4$ and $R^5$ each represent a $C_1$–$C_6$ alkyl group or together represent a $C_2$–$C_6$ alkylene group which may contain heteroatoms, e.g., oxygen or $NR^8$ where $R^8$ is hydrogen or a $C_1$–$C_4$ alkyl group, or the group

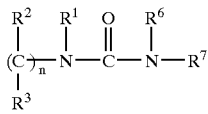

and $R^6$ and $R^7$ which may be the same or different and each represent hydrogen or the group

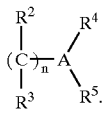

wherein $R^2$, $R^3$, $R^4$ and $R^5$ have the aforestated meanings. In the above general formula it is preferred that $R^1$, $R^2$, $R^3$, $R^6$ and $R^7$ each represent hydrogen, $R^4$ and $R^5$ each represent a methyl group when A represents N or together represent $CH_2CH_2N(CH_3)CH_2$ when A represents CH, and n represents 1–3, and preferably 2 or 3.

Particularly useful tertiary amine ureas include, but are not limited to, mono(tertiary amino alkyl) ureas, bis(tertiary amino alkyl) ureas and mixtures thereof. Illustrative of the suitable mono(tertiary amino alkyl) ureas and bis(tertiary amino alkyl) ureas are 2-dimethylaminoethyl urea; N,N'-bis(2-dimethylaminoethyl) urea; N,N-bis(2-dimethylaminoethyl) urea; 3-dimethylaminopropyl urea; N,N'-bis(3-dimethylaminopropyl) urea; N,N-bis(3-dimethylaminopropyl) urea; 1-(N-methyl-3-pyrrolidino) methyl urea; 1,3-bis(N-methyl-3-pyrrolidino)-methyl urea; 3-piperidinopropyl urea; N,N'-bis(3-piperidinopropyl) urea; 3-morpholinopropyl urea; N,N'-bis(3-morpholinopropyl) urea; 2-piperidinoethyl urea; N,N'-bis(2-piperidinoethyl) urea; 2-morpholinoethyl urea; and N,N'-bis(2-morpholinoethyl) urea with 3-dimethylaminopropyl urea and N,N'-bis(3-dimethylaminopropyl) urea being most preferred. U.S. Pat. Nos. 4,644,017 and 6,232,356 disclose amino alkyl ureas useful in the practice of the present invention, the contents of which being incorporated herein by reference.

In general, the mono-ureas and bis-ureas can be prepared by reacting urea and the corresponding tertiary alkylamine in the appropriate molar ratios under an inert atmosphere and at elevated temperatures of from about 80 to about 180° C. with ammonia being driven off.

The reaction product of the delayed action catalyst system can optionally include one or more of specific reactive tertiary amine(s), tertiary amine carbamate(s) and mixtures thereof. Suitable specific reactive tertiary amine(s) for use in the subject catalyst system are bis(dimethylaminopropyl) amino-2-propanol, bis(dimethylaminopropyl)amine, dimethylaminopropyldipropanolamine, bis(dimethylamino)-2-propanol, N,N,N'-trimethyl-N'-hydroxyethyl-bis(aminoethyl) ether and mixtures thereof.

Suitable tertiary amine carbamate(s) for use in the subject catalyst system are dimethylaminoethoxyethyl carbamate, bis(dimethylaminopropyl)amino-2-propyl carbamate, dimethylaminoethyl carbamate, and the like and mixtures thereof.

In general, the tertiary amine carbamates can be prepared by the reaction of reactive tertiary amines, e.g., a reactive tertiary amine having a reactive hydrogen, e.g., an —OH group, and a diisocyanate. As one skilled in the art would readily appreciate, a reactive tertiary amine having a hydroxyl functional group will react with diisocyanate to form a tertiary amine carbamate while a reactive tertiary amine having a primary or secondary amine functional group will react with diisocyanate to form a tertiary amine urea. Suitable specific reactive tertiary amines, which can be employed in order to prepare the tertiary amine carbamate(s) are dimethylaminoethoxyethanol, dimethylaminoethanol, bis(dimethylaminopropyl)amino-2-propanol, and mixtures thereof. The isocyanates which can be employed in order to prepare the tertiary amine carbamate(s) are aliphatic, cycloaliphatic and aromatic polyfunctional isocyanate, particularly difunctional isocyanates having from 2 to 18 carbon atoms, preferably between 4 and 14 carbon atoms, such as: 1,6-hexamethylene diisocyanate, 1,4-tertramethylene diisocyanate, ethylene diisocyanate and 1,12-dodecane diisocyanate, 5-isocyanato-1-(isocyanatomethyl)-1,3,3-trimethylcyclohexane (isophorone diisocyanate, mixture of isomers), 1,3-bis(1-isocyanato-1-methylethyl)benzene, cyclohexane-1,3-diisocyanate, cyclohexane-1,4-diisocyanate as well as mixtures thereof, 4,4'- and 2,4-diisocyanatodicyclohexylmethane and 1,3- and 1,4-phenylene diisocyanate and mixtures thereof. The preferred isocyanates which can be employed in order to prepare tertiary amine carbamate in the subject invention are: 5-isocyanato-1-(isocyanatomethyl)-1,3,3-trimethylcyclohexane (isophorone diisocyanate, mixtures of isomers), 1,3-bis(1-isocyanato-1-methylethyl)benzene, aliphatic isocyanate such as hexamethylene diisocyanate and mixtures thereof.

By including the delayed action catalyst system of the present invention in the polyurethane reaction mixture, the initiation of the foaming reaction is delayed. Time to full cure, however, is not adversely affected. Furthermore, several surprising results are obtained, especially when using the disclosed catalyst system for making flexible foams in the one-shot foaming process. Certain unexpected advantages were realized upon using as a catalyst the reaction product of the present invention which include: (1) production of flexible foam with improved HACS; (2) production of flexible HR foam based on TDI with improved hardness; (3) a more open or more easily opened cell structure, (e.g., significant reduction in the force required to open the cells of flexible foams by mechanical crushing); and (4) reduced foam shrinkage.

If desired organotin compounds can also be used in the subject delayed catalyst system. Suitable organotin compounds include, for example, any of the organotin compounds used in the production of polyurethanes. Useful organotin compounds include, but are not limited to, organotin carboxylates, organotin oxides, organotin thioesters, organotin mercaptides and the like and mixtures thereof. Examples of useful organotin carboxylates are dibutyl tin dilaurate (available from Crompton Corp. under the Fomrez SUL4 and Fomrez UL-28 tradename). Examples of useful organotin oxides are those available from Crompton Corp. under the Fomrez tradename, e.g., Fomrez SUL-11A. Examples of useful organotin thioesters are those available from Crompton Corp. under the Fomrez tradename, e.g., Fomrez UL24 and UL6. Examples of useful organotin mercaptides are those available from Crompton Corp. under the Fomrez tradename, e.g., Fomrez UL-29 or UL-1.

The reaction products of (a) hydroxy and/or halo acids, (b) a tertiary amine urea, and, optionally, (c) a reactant selected from the group consisting of specific reactive tertiary amine(s), tertiary amine carbamate(s) and mixtures thereof, can be prepared simply by mixing each of the foregoing reactants in a suitable organic solvent, or an aqueous solvent, especially water. Preferable organic solvents are ethylene glycol, diethylene glycol, propylene glycol, and dipropylene glycol. Among the cited solvents, most frequently used are water, diethylene glycol and ethylene glycol. The hydroxy- and/or halo-acid may be added to the resin premix consisting of all the formulation components, including tertiary amine ureas and optional specific reactive tertiary amine compound(s) and/or tertiary amine carbamate and organotin compound. Neutralization of the amine compound(s) in the resin premix by the hydroxy- and/or the halo-acid is a fast process. Equilibration products among acids and amines to form various blocked pairs are also particularly useful. The addition of the reaction product of the forgoing reactants to a resin formulation may result in a solution or a stable dispersion.

The subject catalyst system of the present invention may be the sole catalyst used in the polyurethane production process, or optionally, is employed in combination with one or more other urethane catalyst, e.g., metal salt catalysts, e.g., alkali metal or alkaline earth metal carboxylate catalysts, other delayed action catalysts, or other known polyurethane catalysts. Depending on the specific reactive tertiary amine urea compound(s) and specific reactive tertiary amine(s) and/or reactive tertiary amine carbamate(s) used in the formulation, the quantity of hydroxy- and/or halo-carboxylic acids reacted with the foregoing specific reactive amine compound(s) can be adjusted to achieve the desired reactivity, such as the initiation delay and reactivity profile, during polyurethane formation.

As one skilled in the art will readily appreciate, the desired catalyst systems will contain both free amine and bound amine in the form of (1) the tertiary amine urea compound(s) and hydroxy- and/or halo-carboxylic acid reaction product and (2) the specific reactive tertiary amine (s) and hydroxy- and/or halo-carboxylic acid reaction product and/or the tertiary amine carbamate(s) and hydroxy- and/or halo-carboxylic acid reaction product. Acid exchange equilibrium is expected to occur if there is more than one amine present. Therefore, the amount of free amine and bound amine of these catalyst systems will vary depending upon the equilibrium of the system. Based on acid-base equivalents, the amount of the amine acid reaction product generally will be between about 2% to about 80% of the total amine equivalents in the formulation. A preferred quantity of amine present as the reaction product (specific reactive amine salt) in a resin formulation typically will be between about 2% and about 50% of the total specific reactive tertiary amine content on an equivalents basis and preferably between about 5% and about 40%.

Polyols which are useful in the process of the invention for making a polyurethane, particularly via the one-shot foaming process, are any of the types presently employed in the art for the preparation of flexible slabstock foams, flexible molded foams, semi-flexible foams, and rigid foams. The polyols, e.g., polyether polyols and polyester polyols, ordinarly have hydroxyl numbers in the range of from about 15 to about 700. The hydroxyl numbers are preferably between about 20 to about 60 for flexible foams, between about 100 to about 300 for semi-flexible foams and between about 250 to about 700 for rigid foams.

For flexible foams, the preferred functionality, i.e., the average number of hydroxyl groups per molecule of polyol, of the polyols is about 2 to about 4 and most preferably about 2.3 to about 3.5. For rigid foams the preferred functionality is about 2 to about 8 and most preferably about 3 to about 5.

Polyols which can be used in the process of the present invention, either alone or in admixture, can be any of the following non-limiting classes:

a) polyether polyols derived from the reaction of polyhydroxyalkanes with one or more alkylene oxides, e.g., ethylene oxide, propylene oxide, etc.;

b) polyether polyols derived from the reaction of high-functionality alcohols, sugar alcohols, saccharides and/or high functionality amines, if desired in admixture with low-functionality alcohols and/or amines with alkylene oxides, e.g., ethylene oxide, propylene oxide, etc.;

c) polyether polyols derived from the reaction of phosphorus and polyphosporus acids with alkylene oxides, e.g., ethylene oxide, propylene oxide, etc.;

d) polyether polyols derived from the reaction of polyaromatic alcohols with alkylene oxides, e.g., ethylene oxide, propylene oxide, etc.;

e) polyether polyols derived from the reaction of ammonia and/or an amine with alkylene oxides, e.g., ethylene oxide, propylene oxide, etc.;

f) polyester polyols derived from the reaction of a polyfunctional initiator, e.g., a diol, with a hydroxycarboxylic acid or lactone thereof, e.g., hydroxylcaproic acid or e-carprolactone;

g) polyoxamate polyols derived from the reaction of an oxalate ester and a diamine, e.g., hydrazine, ethylenediamine, etc. directly in a polyether polyol;

h) polyurea polyols derived from the reaction of a diisocyanate and a diamine, e.g., hydrazine, ethylenediamine, etc. directly in a polyether polyol-directly in a polyether polyol.

For flexible foams, preferred types of alkylene oxide adducts of polyhydroxyalkanes are the ethylene oxide and propylene oxide adducts of aliphatic trihydroxyalkanes. For rigid foams, the preferred class of alkylene oxide adducts are the ethylene oxide and propylene oxide adducts of ammonia, toluene diamine, sucrose, and phenol-formaldehyde-amine resins (Mannich bases).

Grafted or polymer polyols are used extensively in the production of flexible foams and are, along with standard polyols, one of the preferred class of polyols useful in the process of this invention. Polymer polyols are polyols that contain a stable dispersion of a polymer, for example in the polyols (a) to (e) above and more preferably the polyols of type (a). Other polymer polyols useful in the process of this invention are polyurea polyols and polyoxamate polyols.

The polyisocyanates that are useful in the polyurethane foam formation process of this invention are organic compounds that contain at least two isocyanate groups and generally will be any of the known aromatic or aliphatic polyisocyanates. Suitable organic polyisocyanates include, for example, the hydrocarbon diisocyanates, (e.g. the alkylenediisocyanates and the arylene diisocyanates), such as methylene diphenyl diisocyanate (MDI) and 2,4- and 2,6-toluene diisocyanate (TDI), as well as known triisocyanates and polymethylene poly(phenylene isocyanates) also known as polymeric or crude MDI. For flexible and semi-flexible foams, the preferred isocyanates generally are, e.g., mixtures of 2,4-tolulene diisocyanate and 2,6-tolulene-diisocyanate (TDI) in proportions by weight of about 80% and about 20% respectively and also about 65% and about 35% respectively; mixtures of TDI and polymeric MDI, preferably in the proportion by weight of about 80% TDI and about 20% of crude polymeric MDI to about 50% TDI and about 50% crude polymeric MDI; and all polyisocyanates of the MDI type. For rigid foams, the preferred isocyanates are, e.g., polyisocyanates of the MDI type and preferably crude polymeric MDI.

The amount of polyisocyanate included in the foam formulations used relative to the amount of other materials in the formulations is described in terms of "Isocyanate Index". "Isocyanate Index" means the actual amount of polyisocyanate used divided by the theoretically required stoichiometric amount of polyisocyanate required to react with all the active hydrogen in the reaction mixture multiplied by one hundred (100) (see, e.g., Oertel, *Polyurethane Handbook*, Hanser Publishers, New York, N.Y. (1985)). The Isocyanate Indices in the reaction mixtures used in the process of this invention generally are between 60 and 140. More usually, the Isocyanate Index is: for flexible TDI foams, typically between 85 and 120; for molded TDI foams, normally between 90 and 105; for molded MDI foams, most often between 70 and 90; and for rigid MDI foams, generally between 90 and 130. Some examples of polyisocyanurate rigid foams are produced at indices as high as 250–400.

Water often is used as a reactive blowing agent in both flexible and rigid foams. In the production of flexible slabstock foams, water generally can be used in concentrations of, e.g., between 2 to 6.5 parts per hundred parts of polyol (phpp), and more often between 3.5 to 5.5 phpp. Water levels for TDI molded foams normally range, e.g., from 3 to 4.5 phpp. For MDI molded foam, the water level, for example, is more normally between 2.5 and 5 phpp. Rigid foam water levels, for example, range from 0.5 to 5 parts, and more often from 0.5 to 1 phpp. Physical blowing agents such as blowing agents based on volatile hydrocarbons or halogenated hydrocarbons and other non-reacting gases can also be used in the production of polyurethane foams in accordance with the present invention. A significant proportion of the rigid insulation foam produced is blown with volatile hydrocarbons or halogenated hydrocarbons and the preferred blowing agents are the hydrochlorofluorocarbons (HCFC) and the volatile hydrocarbons pentane and cyclopentane. In the production of flexible slabstock foams, water is the main blowing agent; however, other blowing agents can be used as auxiliary blowing agents. For flexible slabstock foams, the preferred auxiliary blowing agents are carbon dioxide and dichloromethane (methylene chloride). Other blowing agents may also be used such as, e.g., the chlorofluorocarbon (CFC) trichloromonofluoromethane (CFC-11).

Flexible molded foams typically do not use an inert, auxiliary blowing agent, and in any event incorporate less auxiliary blowing agents than slabstock foams. However, there is a great interest in the use of carbon dioxide in some molded technology. MDI molded foams in Asia and in some developing countries use methylene chloride, CFC-11 and other blowing agents. The quantity of blowing agent varies according to the desired foam density and foam hardness as recognized by those skilled in the art. When used, the amount of hydrocarbon-type blowing agent varies from, e.g., a trace amount up to about 50 parts per hundred parts of polyol (phpp) and $CO_2$ varies from, e.g., about 1 to about 10%. Catalysts that can be used for the production of polyurethanes in addition to the delayed action catalyst system of the present invention include tertiary amines of both the non-reactive (fugitive) and reactive types. Reactive amine catalysts are compounds which contain one or more active hydrogens and, as a consequence, can react with the isocyanate and be chemically bound in the polyurethane polymer matrix. For the production of flexible slabstock and molded foams, the preferred amine catalysts are bis(N,N-dimethylaminoethyl)ether and 1,4-diazabicyclo[2.2.2] octane. For the production of rigid foams, the preferred amine catalysts are dimethylcyclohexylamine (DMCHA) and dimethylethanolamine (DMEA). Metal salt catalysts also can and often are used in polyurethane foam formulations. For flexible slabstock foams, the generally preferred metal salt is stannous octoate. For rigid foams, the preferred metal salt catalysts are potassium acetate and potassium octoate. Metal salt catalysts are ordinarily used in small amounts in polyurethane formulations, e.g., in amounts ranging from about 0.001 phpp to about 0.5 phpp.

Crosslinkers also may be used in the production of polyurethane foams. Crosslinkers are typically small molecules; usually less than 350 molecular weight, which contain active hydrogens for reaction with the isocyanate. The functionality of a crosslinker is greater than 3 and preferably between 3 and 5. The amount of crosslinker used can vary between about 0.1 phpp and about 20 phpp and the amount used is adjusted to achieve the required foam stabilization or foam hardness. Examples of crosslinkers include glycerine, diethanolamine, triethanolamine and tetrahydroxyethylethylenediamine.

Silicone surfactants that may be used in the process of this invention include, e.g., "hydrolysable" polysiloxane-polyoxyalkylene block copolymers, "non-hydrolysable" polysiloxane-polyoxyalkylene block copolymers, cyanoalkylpolysiloxanes, alkylpolysiloxanes, and polydimethylsiloxane oils. The type of silicone surfactant used and the amount required depends on the type of foam produced as recognized by those skilled in the art. Silicone surfactants can be used as such or dissolved in solvents such as glycols. For flexible slabstock foams the reaction mixture usually contains from about 0.1 to about 6 phpp of silicone surfactant, and more often from about 0.7 to about 2.5 phpp. For flexible molded foam the reaction mixture usually contains about 0.1 to about 5 phpp of silicone surfactant, and more often about 0.5 to about 2.5 phpp. For rigid foams the reaction mixture usually contains about 0.1 to about 5 phpp of silicone surfactant, and more often from about 0.5 to about 3.5 phpp. The amount used is adjusted to achieve the required foam cell structure and foam stabilization.

Temperatures useful for the production of polyurethanes vary depending on the type of foam and specific process used for production as well understood by those skilled in the art. Flexible slabstock foams are usually produced by mixing the reactants generally at an ambient temperature of between about 20° C. and about 40° C. The conveyor on which the foam rises and cures is essentially at ambient temperature, which temperature can vary significantly depending on the geographical area where the foam is made and the time of year. Flexible molded foams usually are produced by mixing the reactants at temperatures between about 20° C. and about 30° C., and more often between about 20° C. and about 25° C. The mixed starting materials are fed into a mold typically by pouring. The mold preferably is heated to a temperature between about 20° C. and about 70° C., and more often between about 40° C. and about 65° C. Sprayed rigid foam starting materials are mixed and sprayed at ambient temperature. Molded rigid foam starting materials are mixed at a temperature in the range of about 20° C. to about 35° C. The preferred process used for the production of flexible slabstock foams, molded foams, and rigid foams in accordance with the present invention is the "one-shot" process where the starting materials are mixed and reacted in one step.

The basic procedure used to mix the reactants and prepare laboratory foam pads for evaluation of foam properties was as follows:

1. The formulation ingredients are weighed in preparation for sequential addition to an appropriate mixing container (cardboard cup).
2. A premix of water, catalysts, and diethanolamine (DEOA) was prepared in an appropriate container.
3. A polyol, a cell opener (for MDI formulations), the premix, and a silicone surfactant are mixed thoroughly in the cardboard cup using a drill press at 2000 rpm.
4. The isocyanate was added and mixed with the other reactant ingredients.
5. The reacting mixture was poured into a 30×30×10 cm aluminum mold. The mold temperature was controlled at 60° C. (TDI) or 50° C. (MDI) by thermostat controlled hot water circulation. The mold lid had vent openings at the four corners.

Tables II and III provide measures of foam properties to permit comparison of HACS. Test methods used to measure the physical characteristics of the foam produced in the examples are found below in Table I:

TABLE I

| Physical Characteristic | Test Method |
|---|---|
| Density | ASTM D 3574 Test a |
| HACS | Compression Set (50% compression at 70° C. for 22 h, ISO/DIS 1856) after Humid aging (96 h at 90° C. and 95% RH) |

The terms and abbreviations used in the specification including the following examples have the following meaning:

| Term or Abbreviation | Meaning |
|---|---|
| Polymer polyol OH 22 | Reactive grafted triol with 22 OH No. |
| Polyether polyol OH 28 | Reactive triol with 28 OH No. |
| Polyether polyol OH 32 | Highly reactive triol with 32 OH No. |

-continued

| Term or Abbreviation | Meaning |
|---|---|
| TDI | Tolylene diisocyanate and isomer blends thereof |
| MDI | Methylene diphenyl diisocyanate and blends thereof |
| DEOA | Diethanolamine |
| C1 | N,N'-bis(3-dimethylaminopropyl)urea |
| C2 | 3-dimethylaminopropylurea |
| C3 | reaction product of dimethylaminoethoxyethanol and isophorone diisocyanate |
| C4 | Bis(dimethylaminopropyl) amine |
| C5 | Fomrez UL-50 (organotin catalyst) |
| C6 | Fomrez SUL-11A (organotin catalyst) |
| C7 | Fomrez UL-32 (organotin catalyst) |
| C8 | Fomrez UL-1 (organotin catalyst) |
| Niax Silicone L-3111 | A silicone surfactant (available from Crompton) |
| g | grams |
| mg | milligrams |
| s | seconds |
| min | minute |
| kg | kilograms |
| cm | centimeter |
| % | percent by weight |
| phpp | parts per hundred parts by weight of polyol |
| C. | degree Celsius |
| N | Newton |

While the scope of the present invention is defined by the appended claims, the following non-limiting examples illustrate certain aspects of the invention and, more particularly, describe methods for evaluation. The examples are presented for illustrative purposes and are not to be construed as limitations on the present invention.

The formulations presented hereafter in Tables 2 and 3 are typical for producing a MDI and TDI high resilience (HR) molded foam for automotive seating. The tables report, for each example, that salicyclic acid used to block the amine reactants.

COMPARATIVE EXAMPLES A–D AND EXAMPLES 1–7

Table II set forth below shows a significant improvement of HACS in MDI molded foams employing a delayed action catalyst system within the scope of the invention (i.e., Examples 1–7) as compared to a catalyst system formed from a tertiary amine urea alone or mixtures of a tertiary amine urea and a reactive tertiary amine which is outside the scope of this invention (i.e., Comparative Examples A–D).

TABLE II

| Comp. Ex./Ex. | A | B | C | D | 1 | 2 | 3 | 4 | 5 | 6 | 7 |
|---|---|---|---|---|---|---|---|---|---|---|---|
| POLYURETHANE FORMULATION, (phpp) | | | | | | | | | | | |
| Polyetherpolyol (OH 28) | 100 | 100 | 100 | 100 | 100 | 100 | 100 | 100 | 100 | 100 | 100 |
| Cell Opener | 1 | 1 | 1 | 1 | 1 | 1 | 1 | 1 | 1 | 1 | 1 |
| Water (total) | 3.6 | 3.6 | 3.6 | 3.6 | 3.6 | 3.6 | 3.6 | 3.6 | 3.6 | 3.6 | 3.6 |
| DEOA (98%) | 0.6 | 0.6 | 0.6 | 0.6 | 0.6 | 0.6 | 0.6 | 0.6 | 0.6 | 0.6 | 0.6 |
| Catalyst C1 | 1.3 | 0.3 | — | 0.3 | 0.7 | 0.4 | 0.4 | 0.4 | 0.4 | 0.4 | 0.4 |
| Catalyst C2 | — | 1 | 1.3 | 0.45 | — | — | — | — | — | — | — |
| Catalyst C3 | — | — | — | — | — | 0.7 | 0.7 | 0.7 | 0.7 | — | 0.28 |
| Catalyst C4 | — | — | — | 0.5 | — | — | — | — | — | 0.54 | 0.27 |
| Catalyst C5 | — | — | — | — | 0.05 | 0.03 | — | — | — | 0.03 | 0.03 |
| Catalyst C6 | — | — | — | — | — | — | 0.3 | — | — | — | — |
| Catalyst C7 | — | — | — | — | — | — | — | 0.03 | — | — | — |
| Catalyst C8 | — | — | — | — | — | — | — | — | 0.03 | — | — |
| Salicylic acid | — | — | — | — | 0.1 | 0.16 | 0.16 | 0.16 | 0.16 | 0.24 | 0.19 |
| Niax ® Silicone L-3111 | 1 | 1 | 1 | 1 | 1 | 1 | 1 | 1 | 1 | 1 | 1 |
| MDI (Index) | 100 | 100 | 100 | 100 | 100 | 100 | 100 | 100 | 100 | 100 | 100 |
| Density (kg/m3) | 45.6 | 45.7 | 45.8 | 46.6 | 45.8 | 45.7 | 45.2 | 45.4 | 45.7 | 46.4 | 45.7 |
| HACS, 50% | 25 | 24.5 | 24.3 | 24.1 | 18.9 | 18.8 | 18.4 | 16.5 | 17.1 | 18.6 | 17.2 |

COMPARATIVE EXAMPLE E AND EXAMPLES 8 AND 9

Table III set forth below also shows a significant improvement of HACS in TDI molded foams employing a delayed action catalyst system within the scope of the invention (i.e., Examples 8 and 9) as compared to a catalyst system formed from a tertiary amine urea alone which is outside the scope of this invention (i.e., Comparative Example E).

TABLE III

| | POLYURETHANE FORMULATION, (phpp) | | |
|---|---|---|---|
| Comp. Ex./Ex. | E | 8 | 9 |
| Polyether polyol (OH 32) | 50 | 50 | 50 |
| Polymer polyol (OH 22) | 50 | 50 | 50 |
| Water (total) | 3.6 | 3.6 | 3.6 |
| DEOA (98%) | 1.5 | 1.5 | 1.5 |
| Catalyst C1 | 0.36 | 0.1 | 0.164 |
| Catalyst C2 | 0.36 | 0.1 | — |
| Catalyst C3 | — | 0.7 | 0.7 |
| Catalyst C5 | — | — | 0.012 |
| Salicylic acid | — | 0.1 | 0.124 |
| Niax ® Silicone L-3555 | 1 | 1 | 1 |
| TDI Index | 100 | 100 | 100 |
| Density | 42 | 41 | 41.4 |
| HACS | 33.5 | 26 | 24 |

Although the present invention has been described in preferred forms and with a certain degree of particularity, many changed and variations are possible therein and will be apparent to those skilled in the art after reading the foregoing description. It is therefore to be understood that the present invention may be practiced otherwise than as specifically described herein without departing from the spirit and scope thereof.

What is claimed is:

1. A process for preparing a polyurethane foam comprising the step of reacting a polyisocyanate and an active hydrogen-containing component, including water and an organic polyol, in the presence of a catalytically effective amount of a delayed action amine catalyst system comprising a reaction product of (a) one or more carboxylic acids having hydroxy and/or halo functionality and (b) one or more tertiary amine ureas.

2. The process of claim 1 wherein the carboxylic acid of the reaction product is of the general formula:

$$(X)_n\text{—R—}(COOH)_m$$

wherein R is at least a divalent hydrocarbon moiety; X is a halogen selected from the group consisting of chlorine, bromine, fluorine or hydroxyl; and m and n are integers each separately having a value of at least 1, with the proviso that no single carbon atom has more than two X substituents.

3. The process of claim 2 wherein the divalent hydrocarbon moiety of the carboxylic acid is selected from the group consisting of a linear aliphatic hydrocarbon moiety, a branched aliphatic hydrocarbon moiety, an alicyclic hydrocarbon moiety or an aromatic hydrocarbon moiety.

4. The process of claim 3 wherein the hydroxy and halo functional carboxylic acids are selected from the group consisting of salicylic acid, benzilic acid, hydroxybenzoic acid, dihydroxybenzoic acid, trihydroxybenzoic acid, gluconic acid, citric acid, glycolic acid, dimethylolpropionic acid, malic acid, lactic acid, tartaric acid, 2-hydroxymethylpropionic acid, hydroxybutyric acid, chloropropionic acid, bromopropionic acid, dichloropropionic acid, dibromopropionic acid, chloroacetic acid, dichloroacetic acid, bromoacetic acid, dibromoacetic acid, bromobutyric acid, bromoisobutyric acid, dichlorophenylacetic acid, bromomalonic acid, dibromosuccinic acid, 3-chloro-2-hydroxypropionic acid, dichlorophthalic acid, chloromaleic acid, fluorobenzoic acid, chlorobenzoic acid, bromobenzoic acid, difluorobenzoic acid, dichlorobenzoic acid, dibromobenzoic acid, dibromosalicylic acid, 2-bromocaprylic acid, 2-bromohexadecanoic acid, 2,2-dichloro-1-methyl propionic acid and mixtures thereof.

5. The process of claim 1 wherein the tertiary amine ureas of the reaction product correspond to the general formula:

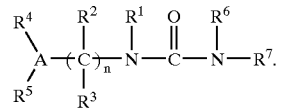

in which A represents CH or N; $R^1$ represents hydrogen or the group

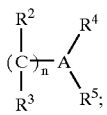

n is an integer from 1 to 6; $R^2$ and $R^3$ each represent hydrogen or a $C_1$–$C_6$ alkyl group; $R^4$ and $R^5$ each represent a $C_1$–$C_6$ alkyl group or together represent a $C_2$–$C_6$ alkylene group which may contain heteroatoms or $NR^8$ where $R^8$ is hydrogen or a $C_1$–$C_4$ alkyl group, or the group

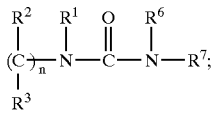

and $R^6$ and $R^7$ which may be the same or different and each represent hydrogen or the group

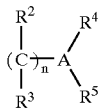

wherein $R^2$, $R^3$, $R^4$ and $R^5$ have the aforestated meanings.

6. The process of claim 5 wherein the tertiary amine ureas are selected from the group consisting of mono(tertiary amino alkyl) ureas, bis(tertiary amino alkyl) ureas and mixtures thereof.

7. The process of claim 6 wherein the mono(tertiary amino alkyl) ureas and bis(tertiary amino alkyl) ureas are selected from the group consisting of 2-dimethylaminoethyl urea, N,N'-bis(2-dimethylaminoethyl) urea, N,N-bis(2-dimethylaminoethyl) urea, 3-dimethylaminopropyl urea, N,N'-bis(3-dimethylaminopropyl) urea, N,N-bis(3-dimethylaminopropyl) urea, 1-(N-methyl-3-pyrrolidino) methyl urea, 1,3-bis(N-methyl-3-pyrrolidino)-methyl urea, 3-piperidinopropyl urea, N,N'-bis(3-piperidinopropyl) urea, 3-morpholino-propyl urea, N,N'-bis(3-morpholinopropyl) urea, 2-piperidinoethyl urea, N,N'-bis(2-piperindinoethyl) urea, 2-morpholinoethyl urea, N,N'-bis(2-morpholinoethyl) urea and mixtures thereof.

8. The process of claim 1 wherein the reaction product further comprises a reactant selected from the group consisting of specific reactive tertiary amine(s), specific tertiary amine carbamate(s) and mixture thereof as component (c).

9. The process of claim 8 wherein the specific reactive tertiary amine compounds are selected from the group consisting of bis(dimethylaminopropyl)amino-2-propanol, bis(dimethylaminopropyl)amine, dimethylaminopropyldipropanolamine, bis(dimethylamino)-2-propanol, N,N,N'-trimethyl-N'-hydroxyethyl-bis(aminoethyl) ether and mixtures thereof.

10. The process of claim 8 wherein the tertiary amine carbamates are selected from the group consisting of dimethylaminoethoxyethyl carbamate, bis(dimethylaminopropyl)amino-2-propyl carbamate, dimethylaminoethyl carbamate, and mixtures thereof.

11. The process of claim 1 wherein the step of reacting further comprises reacting an organotin compound selected from the group consisting of organotin carboxylates, organotin oxides, organotin thioesters, organotin mercaptides and mixtures thereof.

12. The process of claim 1 wherein the step of reacting is conducted in the presence of a polyurethane foam additive selected from the group consisting of an amine catalyst, a metal salt catalyst, a crosslinker, a silicone surfactant, an organic blowing agent and mixtures thereof.

13. A polyurethane foam having repeating units derived from the reaction comprising an organic polyisocyanate and an active hydrogen-containing component, including water and an organic polyol, and catalytically effective amount of a delayed action amine catalyst system comprising a reaction product of (a) one or more carboxylic acids having hydroxy and/or halo functionality and (b) one or more tertiary amine ureas.

14. The polyurethane foam of claim 13 wherein the carboxylic acid of the reaction product is of the general formula:

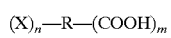

$(X)_n$—R—$(COOH)_m$ wherein R is at least a divalent hydrocarbon moiety; X is a halogen selected from the group consisting of chlorine, bromine, fluorine or hydroxyl; and m and n are integers each separately having a value of at least 1, with the proviso that no single carbon atom has more than two X substituents.

15. The polyurethane foam of claim 14 wherein the divalent hydrocarbon moiety of the carboxylic acid is selected from the group consisting of a linear aliphatic hydrocarbon moiety, a branched aliphatic hydrocarbon moiety, an alicyclic hydrocarbon moiety or an aromatic hydrocarbon moiety.

16. The polyurethane foam of claim 15 wherein the hydroxy and halo functional carboxylic acids are selected from the group consisting of salicylic acid, benzilic acid, hydroxybenzoic acid, dihydroxybenzoic acid, trihydroxybenzoic acid, gluconic acid, citric acid, glycolic acid, dimethylolpropionic acid, malic acid, lactic acid, tartaric acid, 2-hydroxymethylpropionic acid, hydroxybutyric acid, chloropropionic acid, bromopropionic acid, dichloropropionic acid, dibromopropionic acid, chloroacetic acid, dichloroacetic acid, bromoacetic acid, dibromoacetic acid, bromobutyric acid, bromoisobutyric acid, dichlorophenylacetic acid, bromomalonic acid, dibromosuccinic acid, 3-chloro-2-hydroxypropionic acid, dichlorophthalic acid, chloromaleic acid, fluorobenzoic acid, chlorobenzoic acid, bromobenzoic acid, difluorobenzoic acid, dichlorobenzoic acid, dibromobenzoic acid, dibromosalicylic acid, 2-bromocaprylic acid, 2-bromohexadecanoic acid, 2,2-dichloro-1-methyl propionic acid and mixtures thereof.

17. The polyurethane foam of claim 13 wherein the tertiary amine ureas of the reaction product correspond to the general formula:

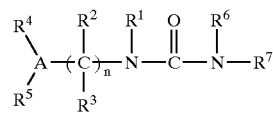

in which A represents CH or N; $R^1$ represents hydrogen or the group

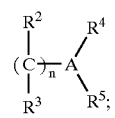

n is an integer from 1 to 6; $R^2$ and $R^3$ each represent hydrogen or a $C_1$–$C_6$ alkyl group; $R^4$ and $R^5$ each represent a $C_1$–$C_6$ alkyl group or together represent a $C_2$–$C_6$ alkylene group which may contain heteroatoms or $NR^8$ where $R^8$ is hydrogen or a $C_1$–$C_4$ alkyl group, or the group

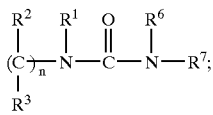

and $R^6$ and $R^7$ which may be the same or different and each represent hydrogen or the group

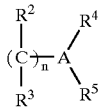

wherein $R^2$, $R^3$, $R^4$ and $R^5$ have the aforestated meanings.

18. The polyurethane foam of claim 17 wherein the tertiary amine ureas are selected from the group consisting of mono(tertiary amino alkyl) ureas, bis(tertiary amino alkyl) ureas and mixtures thereof.

19. The polyurethane foam of claim 18 wherein the mono(tertiary amino alkyl) ureas and bis(tertiary amino alkyl) ureas are selected from the group consisting of 2-dimethylaminoethyl urea, N,N'-bis(2-dimethylaminoethyl) urea, N,N-bis(2-dimethylaminoethyl) urea, 3-dimethylaminopropyl urea, N,N'-bis(3-dimethylaminopropyl) urea, N,N-bis(3-dimethylaminopropyl) urea, 1-(N-methyl-3-pyrrolidino) methyl urea, 1,3-bis(N-methyl-3-pyrrolidino)-methyl urea, 3-piperidinopropyl urea, N,N'-bis(3-piperidinopropyl) urea, 3-morpholino-propyl urea, N,N'-bis(3-morpholinopropyl) urea, 2-piperidinoethyl urea, N,N'-bis(2-piperidinoethyl) urea, 2-morpholinoethyl urea, N,N'-bis(2-morpholinoethyl) urea and mixtures thereof.

20. The polyurethane foam of claim 13 wherein the reaction product further comprises a reactant selected from the group consisting of specific reactive tertiary amine(s), specific tertiary amine carbamate(s) and mixture thereof as component (c).

21. The polyurethane foam of claim 20 wherein the specific reactive tertiary amine compounds are selected from the group consisting of bis(dimethylaminopropyl)amino-2-propanol, bis(dimethylaminopropyl)amine, dimethylaminopropyldipropanolamine, bis(dimethylamino)-2-propanol, N,N,N'-trimethyl-N'-hydroxyethyl-bis(aminoethyl) ether and mixtures thereof.

22. The polyurethane foam of claim 20 wherein the tertiary amine carbamates of the reaction product are selected from the group consisting of dimethylaminoethoxy-ethyl carbamate, bis(dimethylaminopropyl)amino-2-propyl carbamate, dimethylaminoethyl carbamate, and mixtures thereof.

23. The polyurethane foam of claim 13 further comprising an organotin compound selected from the group consisting of organotin carboxylates, organotin oxides, organotin thioesters, organotin mercaptides and mixtures thereof.

* * * * *